United States Patent
Malreddy et al.

(10) Patent No.: US 9,107,148 B1
(45) Date of Patent: Aug. 11, 2015

(54) USE OF PRE-HANDOFF MACRO-CARRIER DATA FOR PRIORITIZATION OF CARRIERS IN FEMTOCELL FREQUENCY-HOPPING PILOT BEACONS

(75) Inventors: Muralidhar Malreddy, Overland Park, KS (US); Ryan Talley, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1185 days.

(21) Appl. No.: 12/627,758

(22) Filed: Nov. 30, 2009

(51) Int. Cl.
H04W 4/00 (2009.01)
H04W 36/00 (2009.01)
H04W 40/00 (2009.01)
H04W 48/20 (2009.01)

(52) U.S. Cl.
CPC .................................... *H04W 48/20* (2013.01)
USPC ........... 455/436; 455/434; 455/443; 455/444; 455/448; 370/328; 370/338

(58) Field of Classification Search
USPC ......... 455/421, 425, 434, 436, 448, 449, 443, 455/444; 370/328, 331, 338
See application file for complete search history.

(56) References Cited

U.S. PATENT DOCUMENTS

| | | |
|---|---|---|
| 4,578,815 A | 3/1986 | Persinotti |
| 5,197,093 A | 3/1993 | Knuth et al. |
| 5,612,948 A | 3/1997 | Fette et al. |
| 5,617,059 A | 4/1997 | Eggleston |
| 5,809,398 A | 9/1998 | Moberg et al. |
| 5,898,382 A | 4/1999 | Treatch |
| 5,987,304 A | 11/1999 | Latt |
| 6,119,005 A | 9/2000 | Smolik |
| 6,132,306 A | 10/2000 | Trompower |
| 6,289,724 B1 | 9/2001 | Varma et al. |
| 6,360,098 B1 | 3/2002 | Ganesh et al. |
| 6,404,775 B1 | 6/2002 | Leslie et al. |
| 6,463,298 B1 | 10/2002 | Sorenson et al. |
| 6,477,354 B1 | 11/2002 | Roberts et al. |
| 6,487,426 B1 | 11/2002 | Haber |
| 6,542,741 B2 | 4/2003 | Wallstedt et al. |

(Continued)

FOREIGN PATENT DOCUMENTS

| WO | W09853621 | 11/1998 |
|---|---|---|
| WO | WO2005011150 | 2/2005 |

OTHER PUBLICATIONS

Spotwave Wireless, Inc., SpotCell™ 112 (PCS-CDMA), "Product Overview," www.spotwave.com, 2003.

(Continued)

*Primary Examiner* — Ariel Balaoing (57) ABSTRACT

Methods and systems are provided for prioritizing carriers in femtocell frequency-hopping pilot beacons. A femtocell receives registration requests from a number of mobile devices requesting to hand off service from a macro-network carrier to the femtocell. The femtocell identifies the macro-network carrier that each mobile device has handed off from. The femtocell then uses that information to prioritize future broadcasts of its frequency-hopping pilot beacon on those macro-network carriers on which the most mobile devices have handed off from. The prioritization could take the form of broadcasting more often on the higher priority one or more carriers per cycle, or broadcasting for a longer continuous period of time on the higher priority one or more carriers per cycle.

20 Claims, 4 Drawing Sheets

(56) References Cited

U.S. PATENT DOCUMENTS

| | | | |
|---|---|---|---|
| 6,571,284 B1 | 5/2003 | Suonvieri | |
| 6,658,269 B1 | 12/2003 | Golemon et al. | |
| 6,690,915 B1 | 2/2004 | Ito et al. | |
| 6,697,603 B1 | 2/2004 | Lovinggood et al. | |
| 6,721,331 B1 | 4/2004 | Agrawal et al. | |
| 6,729,929 B1 | 5/2004 | Sayers et al. | |
| 6,735,432 B1 | 5/2004 | Jarett et al. | |
| 6,754,196 B1 | 6/2004 | Daane et al. | |
| 6,993,287 B2 | 1/2006 | O'Neill | |
| 7,006,797 B1 | 2/2006 | Sullivan et al. | |
| 7,035,587 B1 | 4/2006 | Yarkosky | |
| 7,046,964 B1 | 5/2006 | Sullivan et al. | |
| 7,065,361 B1 | 6/2006 | Fortuna | |
| 7,117,015 B2 | 10/2006 | Scheinert et al. | |
| 7,145,890 B1 | 12/2006 | Seo et al. | |
| 7,190,937 B1 | 3/2007 | Sullivan et al. | |
| 7,299,005 B1 | 11/2007 | Yarkosky et al. | |
| 7,457,295 B2 | 11/2008 | Saunders et al. | |
| 7,457,584 B2 | 11/2008 | Baker et al. | |
| 7,480,485 B1 | 1/2009 | Oh et al. | |
| 7,623,866 B1 | 11/2009 | Spitzer | |
| 7,738,647 B2 | 6/2010 | Davis et al. | |
| 7,848,302 B1 | 12/2010 | Talley et al. | |
| 7,848,758 B1 | 12/2010 | Sill et al. | |
| 8,335,503 B1 * | 12/2012 | Desmond et al. | |
| 2001/0031621 A1 | 10/2001 | Schmutz | |
| 2001/0036837 A1 | 11/2001 | Uistola | |
| 2001/0049281 A1 * | 12/2001 | Duplessis et al. | 455/422 |
| 2002/0044594 A1 | 4/2002 | Bongfeldt | |
| 2002/0045431 A1 | 4/2002 | Bongfeldt | |
| 2002/0052201 A1 | 5/2002 | Wilhelmsson et al. | |
| 2002/0183039 A1 | 12/2002 | Padgett et al. | |
| 2002/0186749 A1 | 12/2002 | Jones | |
| 2003/0083069 A1 | 5/2003 | Vadgama | |
| 2003/0114103 A1 | 6/2003 | Dinkel et al. | |
| 2003/0176192 A1 | 9/2003 | Morimoto et al. | |
| 2003/0211828 A1 | 11/2003 | Dalgleish et al. | |
| 2004/0106408 A1 | 6/2004 | Beasley et al. | |
| 2004/0111236 A1 * | 6/2004 | Lee et al. | |
| 2004/0152480 A1 | 8/2004 | Willars et al. | |
| 2004/0204097 A1 | 10/2004 | Scheinert et al. | |
| 2004/0235478 A1 | 11/2004 | Lindquist et al. | |
| 2005/0148368 A1 | 7/2005 | Scheinert et al. | |
| 2005/0227619 A1 | 10/2005 | Lee et al. | |
| 2006/0019663 A1 * | 1/2006 | Cuffaro et al. | |
| 2008/0002628 A1 | 1/2008 | Bi et al. | |
| 2008/0008510 A1 * | 1/2008 | Lee et al. | |
| 2009/0098871 A1 | 4/2009 | Gogic | |
| 2009/0129336 A1 * | 5/2009 | Osborn | 370/331 |
| 2009/0176453 A1 | 7/2009 | Wilhelmsson et al. | |
| 2009/0215452 A1 | 8/2009 | Balasubramanian et al. | |
| 2009/0247170 A1 | 10/2009 | Balasubramanian et al. | |
| 2010/0048212 A1 * | 2/2010 | Yavuz et al. | 455/436 |
| 2010/0210280 A1 | 8/2010 | Haynes et al. | |
| 2010/0216478 A1 | 8/2010 | Buddhikot et al. | |
| 2010/0279686 A1 * | 11/2010 | Tokgoz et al. | 455/435.1 |
| 2010/0315967 A1 * | 12/2010 | Patel et al. | 370/252 |
| 2010/0329132 A1 * | 12/2010 | Raghothaman et al. | 370/252 |

OTHER PUBLICATIONS

Steve Adams, "The Demands on In-Building Solutions—Using smart antennas and adaptive techniques to improve inbuilding technique," Wireless Business & Technology Magazine, May 20, 2003.
U.S. Appl. No. 11/257,661, filed Oct. 25, 2005.
Office action from U.S. Appl. No. 11/257,661, dated May 2, 2008.
Office action from U.S. Appl. No. 11/257,661, dated Nov. 26, 2008.
U.S. Appl. No. 11/257,648, filed Oct. 25, 2005.
Office action from U.S. Appl. No. 11/257,648, dated Dec. 30, 2008.
Office action from U.S. Appl. No. 11/236,351, dated Oct. 10, 2007.
U.S. Appl. No. 11/449,527, filed Jun. 8, 2006.
Office action from U.S. Appl. No. 11/449,527, dated Oct. 2, 2009.
Office action from U.S. Appl. No. 11/449,527, dated Apr. 14, 2010.
Office action from U.S. Appl. No. 11/449,527, dated Jul. 2, 2010.
Office action from U.S. Appl. No. 11/449,527, dated Sep. 24, 2010.
Office action from U.S. Appl. No. 11/484,001, dated Mar. 6, 2009.
U.S. Appl. No. 12/400,905, filed Mar. 10, 2009.
Office action from U.S. Appl. No. 12/400,905, dated Sep. 28, 2011.
Office Action from U.S. Appl. No. 12/400,905, dated Oct. 3, 2012.

* cited by examiner

USE OF PRE-HANDOFF MACRO-CARRIER DATA FOR PRIORITIZATION OF CARRIERS IN FEMTOCELL FREQUENCY-HOPPING PILOT BEACONS

BACKGROUND

Description of Related Art

1. Cellular Wireless Networks

Many people use mobile stations, such as cell phones and personal digital assistants (PDAs), to communicate with cellular wireless networks. Service providers that operate these wireless networks typically distribute mobile stations to their subscribers, perhaps by selling the mobile stations at retail outlets or over the Internet, or perhaps by offering mobile stations at no cost to people that subscribe to a particular service plan. Service providers then typically assign to each mobile station a telephone directory number—often known as a mobile identification number (MIN) or mobile directory number (MDN)—under which a mobile station may operate. Via a manual or over-the-air provisioning process, the service provider will cause the mobile station to store its MIN in its Number Assignment Module (NAM). Furthermore, a mobile station typically is provided at the time of manufacture with an electronic serial number (ESN), which identifies the mobile station as a unique physical device.

These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket large geographic areas with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link. Furthermore, using a sector as an example of a coverage area, macro base stations may provide service in a given sector on one carrier, or on more than one carrier.

2. Femtocells

Many macro-network subscribers, including private consumers and small businesses, among others, in addition to having wireless service (which may include data service) for their mobile station (or mobile stations), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 Wi-Fi enabled) router. That router may include one or more Ethernet ports to which additional computers or other devices may also be connected, and may include wireless-access-point functionality, providing a WiFi packet-data interface to, for example, laptop computers, digital video recorders (DVRs), appliances, and/or any other computing devices or wireless network adapters.

To address gaps in macro-network coverage (e.g. in buildings) and for other reasons, macro-network service providers have recently begun offering consumers devices referred to herein as femtocells.

A typical femtocell may be approximately the size of a desktop phone or WiFi access point, and is functionally a low-power, low-capacity version of a macro base station. Thus, a typical femtocell will use a normal power outlet, perhaps with a transformer providing a DC power supply. The femtocell may have a wired (e.g. Ethernet) or wireless (e.g. WiFi) connection with the user's router, and would thus have connectivity to the Internet and/or one or more other packet-data networks via the user's broadband connection. A femtocell may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The femtocell also has a wireless-communication (e.g. CDMA) interface that is compatible with the user's mobile station(s), such that the femtocell may act as a micro base station, providing local wireless coverage on the wireless-service provider's network via the user's Internet connection. Usually, a femtocell will provide service on a single RF carrier (or on a single carrier per technology, where multiple technologies, such as CDMA and EV-DO, are supported), and also transmit what is known as a pilot beacon, which includes administrative messages and parameters that mobile stations can use to connect with the femtocell.

Overview

Femtocells normally have auto-configuration capabilities, such that they do not require significant manual configuration by a user of the device. A femtocell may use geographic location information to retrieve from a central database a list of licensed carriers in the region in which the femtocell is positioned. For example, a femtocell may retrieve a list of all licensed carriers in the current geographic region (for example, by county) from a licensee database maintained by the United States Federal Communications Commission (FCC). The femtocell may then use this list in choosing a set of carriers on which to broadcast its pilot beacon in order to advertise service capabilities to mobile stations in its vicinity. Alternately or additionally, the femtocell may obtain channel list messages broadcast by macro-network base stations within communication range of the femtocell and use the set of carriers included in the channel list messages as carriers on which to broadcast its pilot beacon.

Femtocells generally use traffic channels different from those typically used on the macro network to provide service to mobile stations within its vicinity, and thus must broadcast a pilot beacon to advertise their presence to mobile stations that will not typically be looking for service on femtocell traffic-channel frequencies.

A particular geographic area may include macro-network base stations that provide service on different carriers, perhaps including one or more macro-network base stations that themselves provide service on multiple carriers. A femtocell operating in such a geographic area may provide what is known as a frequency-hopping pilot beacon in order to reach all or most mobile stations operating in the geographic area as potential candidates to provide service. A pilot beacon is a broadcast that includes administrative messages and parameters that mobile stations can use to connect with the femtocell. The frequency-hopping pilot beacon is a pilot beacon provided on two or more different frequencies in a time-shared manner, such that a pilot beacon is cyclically broadcast on a number of macro-network carriers.

Most femtocells can only broadcast a frequency-hopping pilot beacon on a limited number of macro-network carrier frequencies. A femtocell may be capable, for example, of cyclically broadcasting a frequency-hopping pilot beacon on only five carriers.

Methods and systems are provided herein for prioritizing carriers in femtocell frequency-hopping pilot beacons. In one aspect, an exemplary embodiment may take the form of a method for a femtocell to prioritize carriers for a frequency-hopping pilot beacon. A femtocell may broadcast its frequency-hopping pilot beacon by repeatedly cycling through pilot-beacon information on each of multiple initial macro-network carriers. The femtocell may begin receiving registration requests from mobile stations that received the pilot beacon requesting to hand off service to the femtocell. In response to each registration request, the femtocell may begin providing service to each mobile station and identify the macro-network carrier on which each mobile station was receiving service prior to handing off to the femtocell.

In order to identify and prioritize a first macro-network carrier, the femtocell may maintain a list identifying the macro-network carrier on which each mobile station was receiving service prior to handing off service to the femtocell. The femtocell could then reference the list to determine the macro-network carrier on which the highest number of mobile stations were receiving service prior to handing off service to the femtocell. After identifying the first macro-network carrier, the femtocell may then prioritize the first macro-network carrier with respect to the frequency-hopping pilot beacon.

The femtocell may prioritize the first macro-network carrier by, for example, transmitting a frequency-hopping pilot beacon on the first macro-network carrier more than once in at least one subsequent cycle of the frequency-hopping pilot beacon. Alternately or additionally, the femtocell may prioritize the first macro-network carrier by, for example, transmitting the frequency-hopping pilot beacon on the first macro-network carrier for a longer first continuous period of time compared to one or more shorter continuous periods of time during which the femtocell transmits the frequency-hopping pilot beacon on each of macro-network carriers other than the first macro-network carrier.

The femtocell may identify the macro-network carrier on which a given mobile station was receiving service prior to handing off to the femtocell by, for example, identifying the macro-network carrier on which the femtocell is currently broadcasting the frequency-hopping pilot beacon at the time the femtocell receives a registration message from the given mobile station. Alternately, the femtocell may identify the macro-network carrier on which a given mobile station was receiving service prior to handing off to the femtocell by, for example, identifying the macro-network carrier on which the femtocell was broadcasting the frequency-hopping pilot beacon a fixed period of time prior to receiving a registration message from the given mobile station. In one further alternative, the femtocell may identify the macro-network carrier on which a given mobile station was receiving service prior to handing off to the femtocell by, for example, receiving a message from the given mobile station identifying the macro-network carrier on which the given mobile station was receiving service prior to handing off service to the femtocell.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

As noted above, femtocells are designed to have low transmission-power capabilities, and consequently to provide coverage areas that are relatively limited in comparison with those of typical macro base stations. As examples, a typical femtocell may be designed to provide a coverage area that is the size of a dorm room, an apartment, a house, and so on. Along with limited transmission power, femtocells are also designed to have a relatively low capacity for serving mobile stations. For example, a femtocell may provide a single carrier and have the capacity (e.g. channel elements) to provide service to up to five mobile stations at any given time, though any suitable number of channel elements (and/or carriers) may be used in a given implementation.

As described, femtocells typically emit a pilot beacon that includes administrative messages and parameters that mobile stations can use to facilitate handoffs from the macro network to the femtocell's carrier. In particular, the pilot beacon normally includes channels known as the pilot, paging, and sync channels. Thus, among the purposes of the femtocell's pilot beacon is to advertise the femtocell's carrier in the femtocell's coverage area, such that mobile stations can opt to tune to that carrier and communicate via the femtocell. As such, the femtocell transmits its pilot beacon on the one or more macro-network carriers in the surrounding area, and more particularly, on the forward-link component of each of those one or more macro-network carriers.

In particular, after an initial auto-configuration process, a femtocell will transmit either what is known as and referred to herein as a "fixed" pilot beacon, or a frequency-hopping pilot beacon. If the one or more macro base stations in the surrounding area all operate on the same carrier, the femtocell will transmit its pilot beacon on only that same carrier (i.e. a fixed pilot beacon). If multiple carriers are provided by the surrounding macro network, however, the femtocell will cycle through those carriers, transmitting its pilot beacon on each macro-network carrier for a fixed period of time (i.e. a frequency-hopping pilot beacon), such as a few hundred milliseconds or one to four seconds.

In the case of a frequency-hopping pilot beacon, the femtocell will typically transmit its pilot-beacon information on each carrier in a set of carriers for a fixed amount of time, and then repeat the cycle. Thus, the overall cycle takes a finite amount of time, and the femtocell typically needs to spend some minimum amount of time broadcasting on each carrier. Additionally, a femtocell must not spend more than a maximum amount of time broadcasting on each carrier in light of interference caused by its broadcast of a pilot beacon on a macro-network carrier. Mobile stations normally include a drop-call timer that detects interference lasting on the macro-network carrier for more than a predefined amount of time. Once the drop-call timer expires, the mobile station may drop the current call. Finally, the femtocell must also consider the slot cycle of mobile stations within its service area. The slot cycle of a mobile station determines how often, and for how long, an idling mobile station will wake-up from a power-save mode and look for any pending page messages and/or for any pilot beacons from other network entities, such as a femtocell.

Taken together, these parameters limit the total number of carriers, and the maximum and minimum amounts of time for each carrier, on which the femtocell can transmit its pilot-beacon information each cycle.

In accordance with the present invention, the femtocell prioritizes certain macro-network carriers over others for inclusion in the frequency-hopping pilot beacon, which is to say inclusion in the set of carriers on which the frequency-hopping pilot beacon hops. The femtocell may identify an initial list of carriers provided by the nearby macro network based on channel-list message information obtained from coverage areas in the vicinity of the femtocell or based on retrieval of a list of licensed carriers in the region from a licensee database maintained by the FCC. The femtocell may then cyclically broadcast its pilot beacon on all of or a subset of the obtained initial list of carriers in the geographic region.

As mobile stations within communication range of the femtocell detect the pilot beacon broadcast by the femtocell, some mobile stations will request to hand off service from the macro-network carrier on which they are currently receiving service to the femtocell. The femtocell may then track the particular macro-network carriers over which the mobile stations handing off to the femtocell were communicating prior to handing off to the femtocell.

By keeping track of the macro-network carriers over which the mobile stations handing off to the femtocell were communicating, the femtocell can determine on which carriers the highest number of mobile stations were receiving service. The femtocell may then utilize this information to modify which macro-network carriers it broadcasts its frequency-hopping pilot beacon on, to modify how long the femtocell broadcasts its frequency-hopping pilot beacon on each macro-network carrier, and/or modify how many times per cycle the femtocell broadcasts its frequency-hopping pilot beacon on each macro-network carrier.

By prioritizing the broadcast of its frequency-hopping pilot beacon on those macro-network carriers from which the highest number of mobile stations have handed off, the femtocell can more effectively prioritize the carriers on which it broadcasts its pilot beacon, likely increasing efficiency and reaching more mobile stations in a quicker manner.

In general, prioritizing the carriers on which the femtocell will broadcast its pilot beacon does not exclude the possibility of still hopping onto other, lower-priority macro-network carriers. For example, a femtocell may still provide its pilot beacon on the lower-priority carriers, but will broadcast its beacon on higher-priority carriers more often and/or for a longer period of time than the lower-priority carriers. The femtocell may broadcast its pilot beacon on the higher-priority carriers more times per cycle, for a greater amount of time compared to other carriers in a cycle, or perhaps in a greater number of cycles per hour, per day, etc. than the lower-priority carriers. Other possibilities exist without departing from the scope and spirit of the present invention, such as any combination of these approaches.

2. Exemplary Architecture a. An Exemplary Communication System

Figure 1:
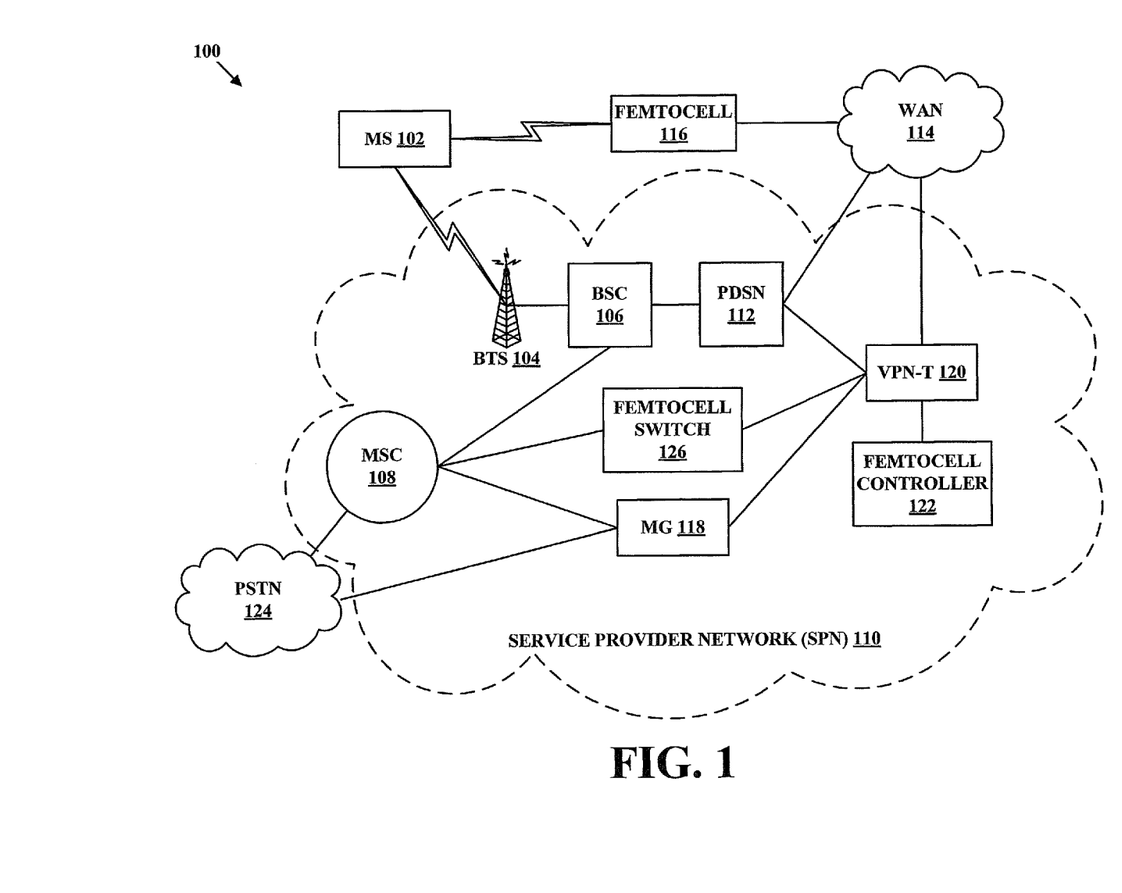
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a service provider network (SPN) 110, a Wide Area Network (WAN) 114, a femtocell 116, and a public switched telephone network (PSTN) 124. The SPN 110 includes a macro base transceiver station (BTS) 104, a base station controller (BSC) 106, a mobile switching center (MSC) 108, a packet data serving node (PDSN) 112, a media gateway (MG) 118, a VPN terminator (VPN-T) 120, a femtocell controller 122, and a femtocell switch 126. Additional entities could be present without departing from the spirit of the invention, such as additional mobile stations in communication with BTS 104, additional entities in communication with WAN 114 and/or PSTN 124, etc. Also, there could be one or more devices and/or networks making up at least part of one or more communication links. For example, there could be one or more routers, cable modems, and/or other devices or networks on the link between femtocell 116 and WAN 114.

Figure 2:
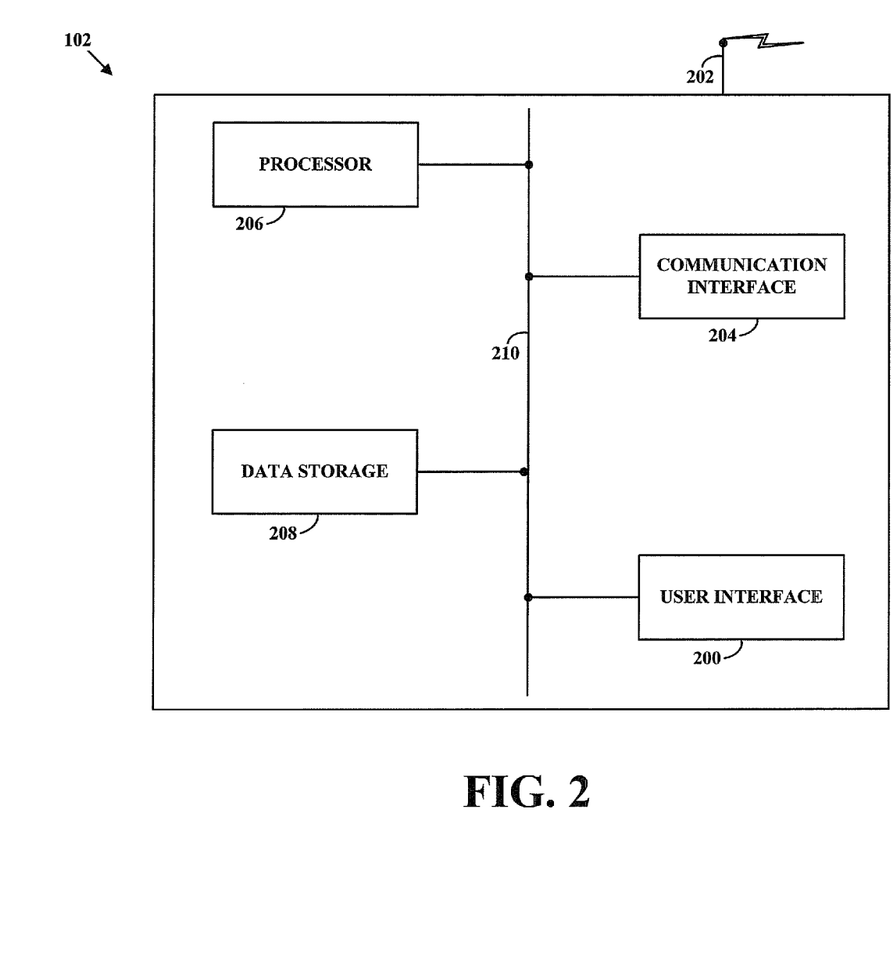
FIG. 2 is a simplified block diagram of a mobile station, in accordance with exemplary embodiments.

Mobile station 102 may be any mobile device arranged to carry out the mobile-station functions described herein. FIG. 2 is a simplified block diagram of a mobile station (MS) 102, in accordance with an exemplary embodiment. As shown, mobile station 102 may include a user interface 200, a wireless-communication interface 202/204, a processor 206, and data storage 208 comprising instructions executable by the processor for carrying out those mobile-station functions. The user interface 200 may include buttons, a touch-screen, a microphone, and/or any other elements for receiving inputs, as well as a speaker, one or more displays, and/or any other elements for communicating outputs.

The wireless-communication interface 202/204 of the mobile station 102 may include an antenna 202 and a chipset 204 suitable for communicating with one or more macro base stations 104 and/or one or more femtocells 116 over suitable air interfaces. For example, the chipset 204 could be suitable for CDMA communication. The chipset 204 or wireless-communication interface 202/204 in general may also, or instead, be able to communicate with other types of networks and devices, such as EV-DO networks, Wi-Fi networks, Bluetooth devices, and/or one or more additional types of networks and devices. The processor 206 and data storage 208 may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Returning to FIG. 1, macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA (and/or any other protocol(s)) coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, femtocell switch 126, and PDSN 112. In general, BSC 106 functions to control one or more macro BTSs such as macro BTS 104, and to provide those one or more macro BTSs with connections to devices such as MSC 108, femtocell switch 126, and/or PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, femtocell switch 126, and/or any other entity, without departing from the invention. And it should be noted that the macro network and/or the femtocell(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, femtocell switch 126, and PSTN 124. In general, MSC 108 acts as a switch between (a) PSTN 124 and one or more BSCs such as BSC 106 and/or (b) between PSTN 124 and one or more femtocells 116 via femtocell switch 126, facilitating communication between mobile stations and PSTN 124.

Service-provider network 110 may encompass all or some of the network elements depicted in FIG. 1 as being included in its dashed-cloud shape. In general, there may be more and/or different communication links among entities within service-provider network 110 than those set forth in FIG. 1, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, WAN 114, and VPN terminator 120. In general, PDSN 112 acts as a network access server between WAN 114 and BSCs such as BSC 106, facilitating packet-data communication between mobile stations and WAN 114 via macro base stations.

WAN 114 may be the well-known global packet-data network generally referred to as the Internet. However, WAN 114 may also be or include one or more other packet-data networks, without departing from the scope and spirit of the present invention. As such, WAN 114 may include one or more other wide area networks, one or more local area networks, one or more public networks, one or more private networks, one or more wired networks, one or more wireless networks, and/or one or more networks of any other type. Devices in communication with WAN 114 may exchange data using a packet-switched protocol such as the Internet Protocol (IP), and may be uniquely identified by an address such as an IP address.

Figure 3:
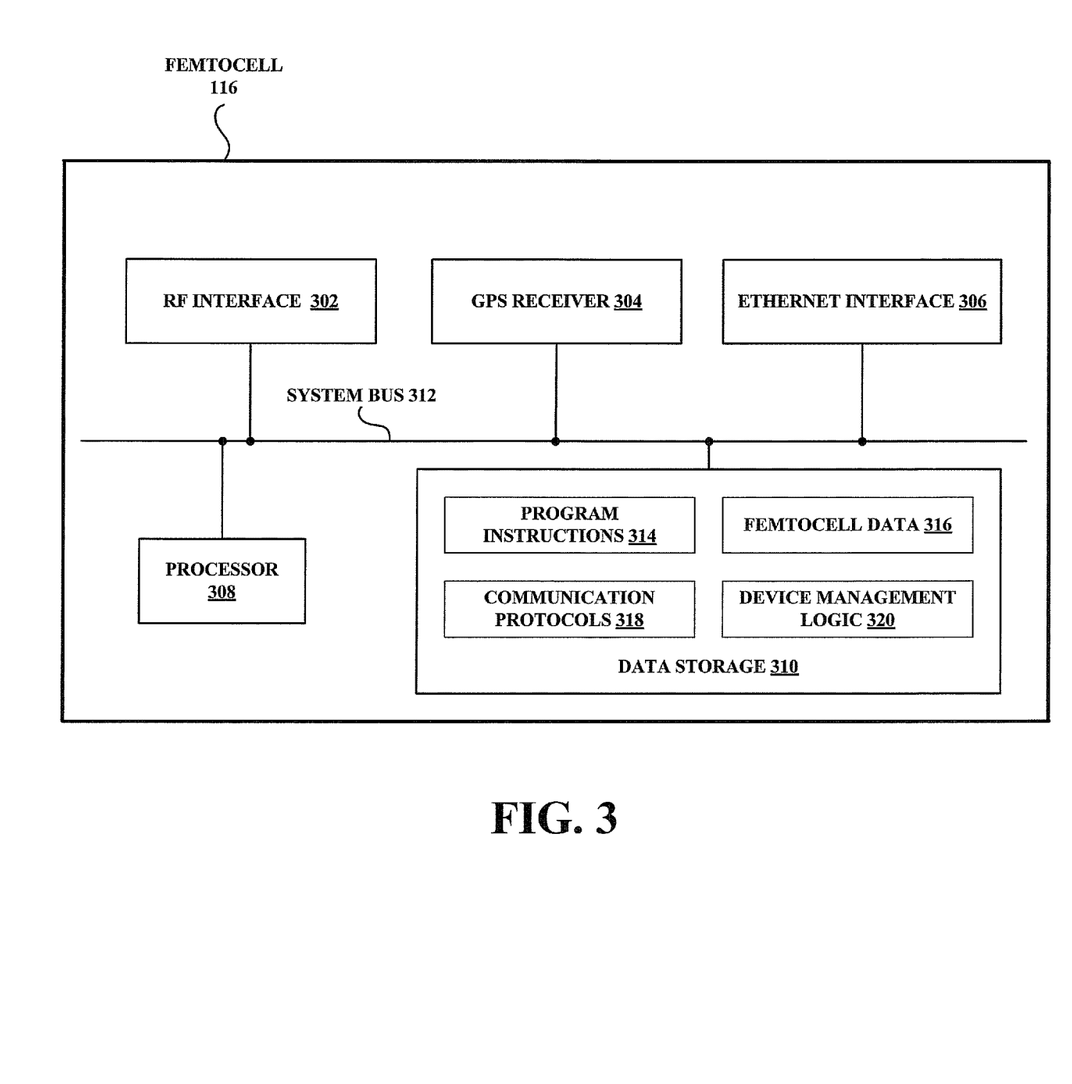
FIG. 3 is a simplified block diagram of a femtocell, in accordance with exemplary embodiments.

Femtocell 116 may be any computing and communication device arranged to carry out the femtocell functions described herein. As such, femtocell 116 may include a communication interface, a processor, and data storage comprising instructions executable by the processor for carrying out those femtocell functions. FIG. 3 depicts an exemplary diagram of femtocell 116, which includes an RF interface 302, a GPS receiver 304, an Ethernet interface 306, a processor 308, and data storage 310, all communicatively linked by a system bus 312. Note that femtocell 116 could have additional and/or different components than those set forth in FIG. 3, and that this structure is provided by way of example only.

RF interface 302 may include one or more antennas, one or more chipsets, a set of one or more channel elements, and/or one or more other components suitable for providing a wireless coverage area according to a wireless-communication protocol such as CDMA (and/or one or more other wireless technologies). GPS receiver 304 may be any known or hereafter developed GPS receiver, suitable for receiving and decoding GPS signals for location and timing purposes, perhaps among other purposes. In some embodiments, a femtocell may have a location module in addition to or instead of a GPS receiver.

Ethernet interface 306 may provide a wired packet-data interface for communicating with a device such as a router or cable modem. Processor 308 may comprise multiple (e.g., parallel) processors, such as a general purpose microprocessor and/or a discrete digital signal processor. The data storage 310 may take various forms, in one or more parts, such as a non-volatile storage block and/or a removable storage medium, and may include (a) program instructions 314 executable by processor 308 for carrying out the femtocell functions described herein, (b) femtocell data 316, which may be any operational data or other type of data stored for use by femtocell 116, (c) communication protocols 318, facilitating and enabling communication with one or more other devices, and (d) device management logic 320, perhaps for memory and file management.

Returning to FIG. 1, media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least femtocell controller 122, PDSN 112, femtocell switch 126, MG 118, and WAN 114. In general, VPN terminator 120 functions to establish secure VPN connections over WAN 114 with femtocells such as femtocell 116, enabling the femtocells to securely communicate with devices on the SPN 110, such as femtocell controller 122, and perhaps beyond.

Femtocell controller 122 may be any networking element arranged to carry out the femtocell-controller functions described herein. Thus, femtocell controller 122 may include a communication interface, a processor, and data storage comprising instructions executable by the processor for carrying out those femtocell-controller functions. The communication interface may include one or more wired and/or wireless interfaces for communicating with at least VPN terminator 120, along with perhaps one or more other entities on service-provider network 110, and beyond.

Among other functions, femtocell controller 122 communicates via VPN terminator 120 with femtocells such as femtocell 116. Femtocell controller 122 may receive requests from various femtocells for configuration data, and those requests may include, among other values, indications of the femtocells' respective locations. Femtocell controller 122 may also be operable to select various operational parameters for femtocells (e.g. carrier, PN offset, whether to broadcast a pilot-beacon, contents of any pilot beacon to be broadcast, transmission-power level, channel-list messages, candidate carriers for pilot-beacon broadcasts), and to transmit those parameters to femtocells, perhaps along with other configuration data and messaging.

Femtocell switch 126 may be any networking element arranged to carry out the femtocell-switch functions described herein. As such, femtocell switch 126 may include a communication interface, a processor, and data storage comprising instructions executable by the processor for carrying out those femtocell-switch functions. The communication interface may include one or more wired and/or wireless interfaces for communicating with at least MSC 108 and VPN terminator 120. In general, femtocell switch 126 acts as a switch between MSC 108 and VPN terminator 120, enabling mobile stations communicating via femtocells to engage in calls over PSTN 124 via MSC 108.

3. Exemplary Operation a. An Exemplary Method

Figure 4:
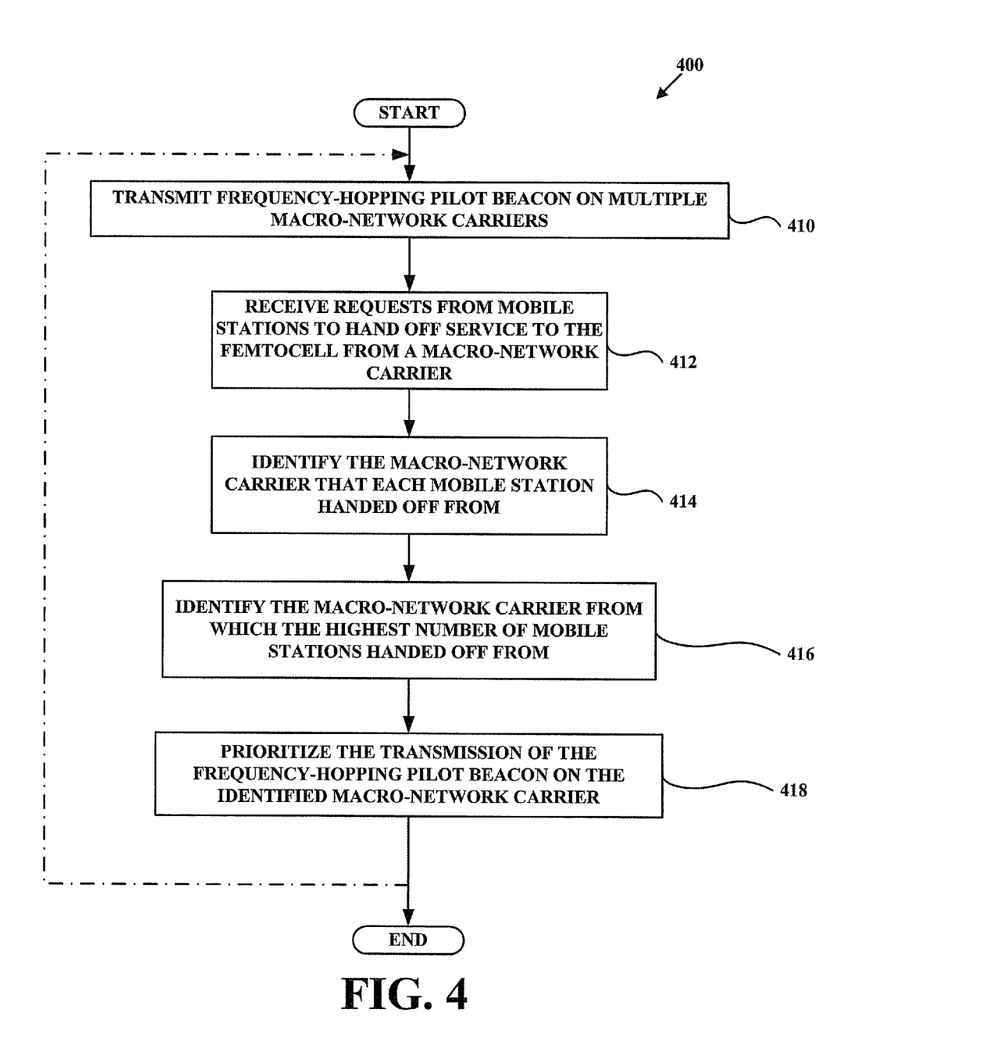
FIG. 4 is a flowchart of a method, in accordance with an exemplary embodiment.

FIG. 4 depicts a flowchart of an exemplary method, in accordance with an exemplary embodiment. In particular, FIG. 4 depicts a method 400 for a femtocell to identify macro-network carriers from which mobile stations hand off, and to prioritize subsequent broadcasts of its frequency-hopping pilot beacon based on the identified carriers.

As shown in FIG. 4, method 400 begins at step 410, when femtocell 116 transmits a frequency-hopping pilot beacon on an initial set of multiple macro-network carriers. At step 412, the femtocell 116 receives requests from mobile stations 102 to hand off service to the femtocell 116 from respective macro-network carriers on which the mobile stations 102 are receiving service. At step 414, the femtocell 116 identifies the macro-network carrier from which each mobile station 102 handed off. At step 416, the femtocell 116 identifies the macro-network carrier from which the highest number of mobile stations 102 handed off. Finally, at step 418, the femtocell prioritizes the transmission of the frequency-hopping pilot beacon on the identified macro-network carrier from step 416.

i. Transmit Frequency-Hopping Pilot Beacon on Multiple Macro-Network Carriers

At step 410, femtocell 116 begins transmitting a frequency-hopping pilot beacon on an initial set of macro-network carriers. The initial set could be a set of macro-network carriers retrieved, for example, from a licensee database maintained by the FCC based on a current location of the femtocell 116, as determined by the GPS receiver 304 within the femtocell 116. Alternatively, the initial list could be retrieved from a cell site database (not shown) contained within the SPN 110 and which provides the femtocell 116 with the carriers on which service is currently being provided in a vicinity of the femtocell 116. Similarly, the femtocell 116 may provide a location to the cell site database as determined by the GPS receiver 304 within the femtocell 116. Other methods could also be used to retrieve an initial set of macro-network carriers on which to broadcast the frequency-hopping pilot beacon.

The femtocell 116 provides its frequency-hopping pilot beacon that repeatedly cycles through transmitting pilot-beacon information on each of the initial set of macro-network carriers. As explained above, this pilot beacon may include a pilot channel, a paging channel, and a sync channel. In general, the pilot-beacon information includes messages and parameters that mobile stations 102 can use to facilitate handoffs from macro-network carriers to a femtocell's 116 carrier. As such, femtocell 116 causes its pilot beacon to cyclically hop to multiple macro-network carriers on which service is provided by the macro network in the surrounding area.

ii. Receive Requests From Mobile Stations to Hand Off Service to the Femtocell From a Macro-Network Carrier At step 412, the femtocell receives requests from mobile stations 102 to hand off service to the femtocell 116 from a macro-network carrier.

As noted earlier, mobile stations 102 in the macro network are programmed to select and idle on one of those carriers set forth in a channel-list message (CLM) based on a pre-determined algorithm executed by the mobile station 102. In an idle state, the mobile station 102 is tuned to the selected carrier to check for incoming pages, SMS messages, and the like, and the mobile station 102 sends any access requests to a serving base transceiver station 104 on that carrier. During operation, a mobile station 102 may detect a pilot signal from the femtocell 116 and request and receive service from that femtocell 116. To facilitate this detection process, the mobile station 102 may monitor signal conditions (e.g., carrier-to-interference (C/I) ratio and/or a signal-to-interference-plus-noise ratio (SINR)) for a plurality of coverage areas detected by the mobile station 102. The mobile station 102 may then select, request, and receive service in the coverage area with the best signal conditions (i.e., the "strongest" coverage area).

For any number of reasons, including a reduction in signal strength, for example, mobile station 102 may decide to switch to a different coverage area, perhaps a coverage area associated with femtocell 116. In this respect, the mobile station 102 may request service from the femtocell 116, and notify the service provider network (SPN) 110 of its decision to switch to the coverage area associated with the femtocell 116. The SPN 110 and femtocell 116 may then function to hand off service of the mobile station 102 from the current coverage area on the macro-network (the source coverage area served by BTS 104) to the target coverage area served by femtocell 116.

iii. Identify the Macro-Network Carrier From Which Each Mobile

Station Handed Off

At step 414, the femtocell 116 identifies the macro-network carrier on which each mobile station 102 was receiving service prior to requesting to hand off to the femtocell 116. The actual method of identifying the prior macro-network carrier may take several forms.

For example, the femtocell 116 may identify the macro-network carrier from which a given mobile station 102 handed off by identifying the macro-network carrier on which the femtocell 116 is currently broadcasting its frequency-hopping pilot beacon at the time the femtocell 116 receives a registration request from the given mobile device 102. This method effectively assumes that mobile stations 102 detect the pilot beacon broadcast by the femtocell 116 and responsively transmit a registration request to the femtocell 116 before the femtocell 116 switches to transmitting on a different macro-network carrier. In the event that a mobile station 102 delays in transmitting its registration request, or detects the pilot beacon on a macro-network carrier near the end of a transmission time for that macro-network carrier, the femtocell 116 may identify the incorrect carrier. However, as the sample set builds over time, and due to the rarity of these occurrences, the effects of such identification errors should be minimized. Additionally, the simplicity of such a method may outweigh the downside of occasional misidentifications.

Alternatively, and in order to compensate for the time it takes a femtocell's pilot beacon to reach the mobile station, the time it takes a mobile station to process the pilot beacon and make a determination to hand off service to the femtocell, the time it takes for a mobile station's registration request to reach the femtocell, and/or the time it takes for the femtocell 116 to process the registration request, the femtocell 116 may be configured to identify the macro-network carrier on which the femtocell was broadcasting the frequency-hopping pilot beacon a period of time prior to receiving a registration request from the given mobile device. This period of time may be fixed or variable, and will be referred to herein as the "look-back" time period.

The look-back time period may be a fixed period of time equal to, or equal to a portion of, the time it takes a femtocell's pilot beacon to reach the mobile station, the time it takes a mobile station to process the pilot beacon and make a determination to hand off service to the femtocell, the time it takes for a mobile station's registration request to reach the femtocell, and the time it takes for the femtocell 116 to process the registration request. The fixed look-back period of time could be an average value determined by experiment across several types of mobile stations 102.

Alternatively, the look-back period of time may not be fixed at all, but may be variable and updateable based on measured response times in the network in which the femtocell operates. Other methods of calculating delays could also be used. In this manner, the femtocell may be able to avoid, or substantially reduce, the number of macro-carrier misidentifications.

In order to determine what macro-network carrier the femtocell 116 was broadcasting its pilot beacon on a period of time before processing a registration request from a mobile station 102, the femtocell 116 may maintain a history of the last "n" macro-network carriers on which the femtocell 116 has broadcast its frequency-hopping pilot beacon, where "n" could be, for example, greater or equal to one. The list could be maintained in a memory of the femtocell 116, and could be implemented via, for example, a circular queue that is updated as the femtocell 116 broadcasts its pilot beacon on different macro-network carriers. For example, assuming that the femtocell 116 broadcasts its pilot beacon on a different macro-network carrier at a regular interval of 3.84 seconds, a history list may look like the list set forth in Table 1.

TABLE 1

Example History List of Past "n" Macro-Network Carriers, where n = 3

| Entry # | Time Period | Macro-Network Frequency |
|---|---|---|
| 1 | 3.84 s | F1 |
| 2 | 3.84 s | F2 |
| 3 | 3.84 s | F3 |

As shown in Table 1, the femtocell 116 may track "n" of the past macro-network carriers on which it has broadcast its pilot beacon, where "n" may be, for example, three. Responsive to receiving a registration request from a mobile station 102, the femtocell 116 may retrieve the current value of the look-back time period, may determine how far into the current pilot beacon broadcast it is, and may then use the retrieved and determined values to index into the history list to associate a macro-network frequency with the mobile station 102. For example, assuming the value of the look-back time period is 1.5 s and the femtocell is 1 s into broadcasting on a current macro-network frequency F0 at the time the femtocell 116 receives a registration request from a mobile station 102, the femtocell 116 would subtract the 1 s from the 1.5 s look-back value and reference the history list with an index of 0.5 s to determine that the mobile station 102 should be associated with macro-network frequency F1.

In a second example, assuming the look-back time period is 5 s and the femtocell is 0.5 s into broadcasting on the current macro-network frequency ID F0 at the time the femtocell 116 receives a registration request from the motile station 102, the femtocell 116 would subtract 0.5 s from the 5 s look-back value, and reference the history list with an index of 4.5 s to determine that the mobile station 102 should be associated with macro-network frequency F2. Of course, other history list structures could be used to keep track of past macro-network carriers, and other parameters could factor into the selection of the historical macro-network carrier.

In another embodiment, the femtocell 116 may instead rely upon the mobile station 102 to inform it of the macro-network carrier on which it was receiving service prior to handing off to the femtocell 116. The mobile station 102 may inform the femtocell 116 of the prior macro-network carrier by, for example, transmitting a message to the femtocell 116 during or after registration indicating the macro-network carrier on which it was receiving service prior to handing off. The identity of the macro-network carrier may be included within the registration request itself, or may be sent in a separate message after the mobile station 102 begins receiving service from the femtocell 116. Other methods of informing the femtocell 116 could be used as well. For example, one alternative could involve the SPN 110 receiving notification from the mobile station 102 of its intent to hand off service from a current BTS 104 to the femtocell 116, and the SPN 110 responsively informing the femtocell 116 of the macro-network carrier that the mobile station 102 handed off from. Other alternatives are possible as well.

The femtocell 116 may maintain a record of the macro-network carriers on which mobile stations 102 handing off to the femtocell 116 were receiving service. For example, the femtocell 116 may maintain a record of macro-network carriers as set forth in Table 2.

TABLE 2

Macro-Network Carrier Frequency Record

| Macro-Network Carrier Frequency | Number of Mobile Stations Handing Off from Freq. | EIN or ESN of Mobile Stations Handing Off from Freq. ID |
|---|---|---|
| F1 | 3 | 111-555-2222; 123-555-4567; 000-555-6789 |
| F2 | 2 | 987-555-6543; 353-555-1212 |
| F3 | 1 | 555-555-5555 |
| F4 | 0 | — |
| F5 | 0 | — |

As shown in Table 2, the femtocell 116 may track the macro-network frequency used by each mobile station 102 prior to handing off to the femtocell 116. The femtocell 116 may then keep track of and increment a value associated with each macro-network frequency whenever a mobile station 102 hands off from that macro-network frequency. The femtocell 116 may optionally also keep track of an associated EIN or ESN of each mobile station 102 to prevent the frequent movement of a single phone between the femtocell 116 and the macro-network from skewing the results of the macro-network carrier frequency record. For example, the femtocell 116 may first determine whether an EIN or ESN associated with a mobile station 102 handing off service to the femtocell 116 is already listed in the macro-network carrier frequency record before incrementing a value associated with the macro-network frequency from which the mobile station handed off. For simplicity, Table 2 only illustrates an embodiment in which the EIN of each mobile station 102 is retained. Of course, other methods of tracking macro-network carriers could also be used.

iv. Identify the Macro-Network Carrier from which the Highest Number of Mobile Stations Handed Off At step 416, the femtocell 116 identifies the macro-network carrier(s) from which the highest number(s) of mobile stations handed off. By keeping track of the number of mobile stations 102 that hand off from particular macro-network carriers in a macro-network carrier frequency record, similar to the one set forth in Table 2, the femtocell 116 can determine which macro-network carriers are more likely to be serving mobile stations 102 that would hand off to the femtocell 116.

In step 416, the femtocell 116 may sort the macro-network carrier frequency record (or similar structure) by the number of mobile stations handing off from each macro-network frequency, and reference the top "m" entries to identify the macro-network carrier(s) from which the highest number(s) of mobile stations handed off. Alternately, the femtocell 116 may simply search the macro-network carrier frequency record (or similar structure), keeping track of the "m" entries having the highest value in the "Number of Mobile Stations Handing Off from Freq." field. Once the entire search is completed, the remaining "m" entries that the femtocell is keeping track of will identify the macro-network carrier(s) from which the highest number(s) of mobile stations handed off. The value of "m" may be partially dictated by the limit of the number of macro-network carriers on which a femtocell 116 is capable of broadcasting its frequency-hopping pilot beacon during a cycle. As one example, the value of "m" may be five.

v. Prioritize the Transmission of the Frequency-Hopping Pilot Beacon on the Identified Macro-Network Carrier Once the femtocell 116 has identified the macro-network carrier(s) from which the highest number(s) of mobile stations handed off, the femtocell 116 may then, at step 418, use that information in subsequent cycles of its frequency-hopping pilot beacon to prioritize those carriers on which mobile stations are most likely to be found.

The femtocell 116 may prioritize a first carrier by transmitting the frequency-hopping pilot beacon on the first macro-network carrier more than once in the at least one subsequent cycle of the frequency hopping pilot beacon. Alternately or additionally, the femtocell 116 may prioritize a first carrier by transmitting the frequency-hopping pilot beacon on the first carrier for a longer first continuous period of time compared to one or more shorter continuous periods of time during which the femtocell 116 transmits the frequency-hopping pilot beacon on each of carriers other than the first carrier.

For example, assuming the state of the macro-network carrier frequency record in Table 2, the macro-network carrier F1 is associated with the highest number of mobile stations 102 that have handed off to the femtocell 116, and thus represents the carrier on which additional mobile stations are most likely to be found. Without prioritizing carriers, the femtocell 116 may cycle through macro-network carriers F1-F5, transmitting its pilot beacon on each of those macro-network carriers for a fixed period of time (i.e. a conventional frequency-hopping pilot beacon), such as for a few hundred milliseconds or one to four seconds, before cycling back to the beginning of the list. After identifying and prioritizing the carrier F1, however, the femtocell 116 may transmit its frequency-hopping pilot beacon on carrier F1 more than once in the cycle. For example, the femtocell 116 may broadcast its pilot beacon in the following order: F1→F2→F3→F1→F4, before repeating the cycle again. In the next cycle, the femtocell 116 may broadcast on the same carriers again, or may include other remaining carriers. For example, in the next cycle, the femtocell 116 may broadcast its pilot beacon in the following order: F1→F2→F3→F1→F5.

As set forth above, the slot cycle of a mobile station determines how often, and for how long, an idling mobile station will wake-up from a power-save mode and look for any pending page messages and/or for any pilot beacons from other network entities, such as a femtocell 116. By broadcasting on the higher priority carrier F1 more often in each cycle, the femtocell 116 is more likely to be broadcasting its pilot beacon to potential mobile stations 102 in the region during their respective slot cycle. Of course, in subsequent cycles of the femtocell's 116 frequency-hopping pilot beacon, the order of carriers may be switched in order to allow for mobile stations 102 having varying slot cycles an opportunity to receive the pilot beacon. For example, the next cycle in which carrier F1 is still prioritized may take the form of: F2→F3→F1→F5→F1, before repeating the cycle again. In other embodiments, the femtocell 116 may not be limited to five carriers, and more or less than five macro-network carriers could be used in each cycle. Additionally, the femtocell may prioritize more than one carrier at a time. For example, the femtocell may prioritize both carriers F1 and F2 by broadcasting its pilot beacon in the following manner: F1→F2→F3→F1→F2, before repeating the cycle again. Other orders could also be used.

Alternately, and still assuming the state of the macro-network carrier frequency record in Table 2, the femtocell may prioritize the carrier F1 by transmitting its frequency-hopping pilot beacon on carrier F1 for a longer continuous period of time compared to a shorter continuous period of time on carriers F2-F5. For example, the femtocell 116 may broadcast is pilot beacon in the following order and for the following times: F1 (3.84 s)→F2 (2 s)→F3 (2 s)→F4 (2 s)→F5 (2 s), before repeating the cycle. Similar to the above, in subsequent cycles of the femtocell's 116 frequency-hopping pilot beacon, the order of carriers may be switched in order to allow for mobile stations having varying slot cycles an opportunity to receive the pilot beacon. For example, a subsequent cycle in which carrier F1 is still prioritized may take the form of: F2 (2 s)→F3 (2 s)→F4 (2 s)→F1 (3.84 s)→F5 (2 s), before repeating the cycle again. Additionally, the femtocell 116 may prioritize more than one carrier at a time. For example, the femtocell 116 may prioritize both carriers F1 and F2 by broadcasting its pilot beacon in the following manner: F1 (3.84 s)→F2 (3.84 s)→F3 (1.4 s)→F4 (1.4 s)→F5 (1.4 s). Other possibilities exist for prioritizing carriers without departing from the scope and spirit of the present invention.

In any of the above embodiments, the femtocell 116 may continue broadcasting in the manner set forth above for an indeterminate amount of time. Alternatively, the femtocell 116 could intermittently re-calculate the highest priority one or more carriers, and modify the pilot beacon transmission method accordingly. Of course, the femtocell may also re-calculate the highest priority one or more carriers before every pilot beacon transmission cycle. Other timings could also be used.

4. CONCLUSION

Various exemplary embodiments have been described above. Those skilled in the art will understand, however, that changes and modifications may be made to those examples without departing from the scope of the claims.

The invention claimed is:

1. A method for a femtocell to prioritize at least one carrier for a frequency-hopping pilot beacon, the method comprising:
   a femtocell transmitting a frequency-hopping pilot beacon, wherein transmitting a frequency-hopping pilot beacon comprises repeatedly cycling through transmitting pilot-beacon information on each of multiple macro-network carriers;
   the femtocell receiving registration requests from mobile devices each requesting to hand off service to the femtocell from one of the multiple macro-network carriers, and responsively providing service to the mobile devices;
   the femtocell identifying the macro-network carriers on which the mobile devices were receiving service prior to handing off to the femtocell, including identifying a first macro-network carrier as the macro-network carrier on which the highest number of the mobile devices were receiving service prior to handing off to the femtocell; and
   based at least in part on the identifying step, prioritizing at least the identified first macro-network carrier with respect to a total amount of transmission time in at least one subsequent cycle of the frequency-hopping pilot beacon.

2. The method of claim 1, wherein the frequency-hopping pilot beacon comprises a pilot channel, a paging channel, and a sync channel.

3. The method of claim 1, further comprising:
   the femtocell maintaining a list identifying the macro-network carrier on which each mobile device was receiving service prior to handing off service to the femtocell,
   wherein the identifying the first macro-network carrier comprises sorting the list based on the number of mobile devices that were receiving service on each macro-network carrier prior to handing off service to the femtocell.

4. The method of claim 1, wherein the femtocell prioritizes the first macro-network carrier by transmitting the frequency-hopping pilot beacon on the first macro-network carrier more than once in the at least one subsequent cycle of the frequency hopping pilot beacon.

5. The method of claim 1, wherein the femtocell prioritizes the first macro-network carrier by transmitting the frequency-hopping pilot beacon on the first macro-network carrier for a longer first continuous period of time compared to one or more shorter continuous periods of time during which the femtocell transmits the frequency-hopping pilot beacon on each of macro-network carriers other than the first macro-network carrier.

6. The method of claim 1, wherein the femtocell identifying the macro-network carrier on which a given mobile device was receiving service prior to handing off to the femtocell comprises the femtocell identifying the macro-network carrier on which the femtocell is currently broadcasting the frequency-hopping pilot beacon at the time the femtocell receives a registration message from the given mobile device.

7. The method of claim 1, wherein the femtocell identifying the macro-network carrier on which a given mobile device was receiving service prior to handing off to the femtocell comprises the femtocell identifying the macro-network carrier on which the femtocell was broadcasting the frequency-hopping pilot beacon a fixed period of time prior to receiving a registration message from the given mobile device.

8. The method of claim 7, wherein the femtocell maintains a history of the last "n" macro-network carriers on which the femtocell has broadcasted the frequency-hopping pilot beacon, where 1<n, and identifies the macro-network carrier on which the femtocell was broadcasting the frequency-hopping pilot beacon a fixed period of time prior to receiving a registration message from the given mobile device by referencing the history.

9. The method of claim 1, wherein the femtocell identifying the macro-network carrier on which a given mobile device was receiving service prior to handing off to the femtocell comprises the femtocell receiving a message from the given mobile device identifying the macro-network carrier on which the given mobile device was receiving service prior to handing off service to the femtocell.

10. The method of claim 9, wherein the message also includes a request for service from the femtocell.

11. A femtocell comprising:
a communication interface;
a processor; and
data storage comprising instructions executable by the processor to:
transmit a frequency-hopping pilot beacon by repeatedly cycling through transmitting pilot-beacon information on each of multiple macro-network carriers;
receive registration requests from mobile devices each requesting to hand off service to the femtocell from one of the multiple macro-network carriers, and responsively providing service to the mobile devices;
identify the macro-network carriers on which the mobile devices were receiving service prior to handing off to the femtocell, including identifying a first macro-network carrier as the macro-network carrier on which the highest number of the mobile devices were receiving service prior to handing off to the femtocell; and
prioritize at least the identified first macro-network carrier with respect to a total amount of transmission time in at least one subsequent cycle of the frequency-hopping pilot beacon.

12. The femtocell of claim 11, wherein the frequency-hopping pilot beacon comprises a pilot channel, a paging channel, and a sync channel.

13. The femtocell of claim 11, wherein the data storage further comprises instructions executable by the processor to maintain a list identifying the macro-network carrier on which each mobile device was receiving service prior to handing off service to the femtocell, and
wherein the identifying a first macro-network carrier comprises sorting the list based on the number of mobile devices that were receiving service on each macro-network carrier prior to handing off service to the femtocell.

14. The femtocell of claim 11, wherein the data storage further comprises instructions executable by the processor to prioritize the first macro-network carrier by transmitting the frequency-hopping pilot beacon on the first macro-network carrier more than once in the at least one subsequent cycle of the frequency-hopping pilot beacon.

15. The femtocell of claim 11, wherein the data storage further comprises instructions executable by the processor to prioritize the first macro-network carrier by transmitting the frequency-hopping pilot beacon on the first macro-network carrier for a longer first continuous period of time compared to one or more shorter continuous periods of time during which the femtocell transmits the frequency-hopping pilot beacon on each of macro-network carriers other than the first macro-network carrier.

16. The femtocell of claim 11, wherein the instructions to identify the macro-network carrier on which a given mobile device was receiving service prior to handing off to the femtocell comprise instructions to identify the macro-network carrier on which the femtocell is currently broadcasting the frequency-hopping pilot beacon at the time the femtocell receives a registration message from the given mobile device.

17. The femtocell of claim 11, wherein the instructions to identify the macro-network carrier on which a given mobile device was receiving service prior to handing off to the femtocell comprise instructions to identify the macro-network carrier on which the femtocell was broadcasting the frequency-hopping pilot beacon a fixed period of time prior to receiving a registration message from the given mobile device.

18. The femtocell of claim 17, wherein femtocell maintains a history of the last "n" macro-network carriers on which the femtocell has broadcasted the frequency-hopping pilot beacon, where 1<n, and identifies the macro-network carrier on which the femtocell was broadcasting the frequency-hopping pilot beacon a fixed period of time prior to receiving a registration message from the given mobile device by referencing the history.

19. The femtocell of claim 11, wherein the instructions to identify the macro-network carrier on which a given mobile device was receiving service prior to handing off to the femtocell comprise instructions to receive and process a message from the given mobile device identifying the macro-network carrier on which the given mobile device was receiving service prior to handing off service to the femtocell.

20. The femtocell of claim 19, wherein the message also includes a request for service from the femtocell.

* * * * *